(12) United States Patent
Roh et al.

(10) Patent No.: US 9,006,128 B2
(45) Date of Patent: Apr. 14, 2015

(54) CATALYST FOR FUEL CELL AND METHOD FOR PREPARING THE SAME

(75) Inventors: Bum Wook Roh, Gyeonggi-do (KR); Ki Sub Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1128 days.

(21) Appl. No.: 12/952,067

(22) Filed: Nov. 22, 2010

(65) Prior Publication Data

US 2012/0028169 A1 Feb. 2, 2012

(30) Foreign Application Priority Data

Jul. 30, 2010 (KR) .................. 10-2010-0073821

(51) Int. Cl.
*H01M 4/92* (2006.01)
*B01J 21/18* (2006.01)
(Continued)

(52) U.S. Cl.
CPC *B01J 35/06* (2013.01); *B01J 23/42* (2013.01); *B01J 23/44* (2013.01); *B01J 23/825* (2013.01); *B01J 23/8913* (2013.01); *B01J 23/892* (2013.01); *B01J 37/0036* (2013.01); *B01J 37/04* (2013.01); *H01M 4/8882* (2013.01); *H01M 4/921* (2013.01); *H01M 4/926* (2013.01);
(Continued)

(58) Field of Classification Search
None
See application file for complete search history.

(56) References Cited

U.S. PATENT DOCUMENTS

2004/0121221 A1* 6/2004 Suzuki et al. .................. 429/44
2007/0082137 A1* 4/2007 Lin et al. ..................... 427/370
(Continued)

FOREIGN PATENT DOCUMENTS

JP 08-180879 7/1996
JP 2003-115302 4/2003
(Continued)

OTHER PUBLICATIONS

"Carbon supports for low-temperature fuel cell catalysts" Applied Catalysis B: Environmental vol. 88 (2009) p. 1-2 Ermete Antolini.*
(Continued)

*Primary Examiner* — Melvin C Mayes
*Assistant Examiner* — Douglas Call
(74) *Attorney, Agent, or Firm* — Mintz Levin Cohn Ferris Glovsky and Popeo, P.C.; Peter F. Corless

(57) ABSTRACT

The present invention provides a support for an electrode of a polymer electrolyte membrane fuel cell, a fuel cell, and a platinum-supported catalyst, and an electrode using the same. In particular, the present invention provides a method in which linear crystalline carbon nanofibers and nonlinear crystalline carbon particles with increased surface area and improved crystallinity are used to enhance the active site of catalyst particles and ensure the durability of the catalyst by the crystalline carbon materials. The linear crystalline carbon nanofibers are grown to have a predetermined fiber diameter by heat treatment at a high temperature in a gas phase of hydrocarbon in an inert gas atmosphere using an oxide such as Ni, Fe, Mn, etc. as a catalyst. The crystallinity of the linear crystalline carbon nanofibers is also improved by the heat treatment. As the nonlinear crystalline carbon particles, commercially available acetylene black that has been heat-treated at a high temperature under steam to expand the surface area and improve the crystallinity, can be used to thereby provide high surface area and ensure excellent oxidation resistance.

8 Claims, 9 Drawing Sheets

(51) Int. Cl.
*H01M 4/88* (2006.01)
*B82Y 40/00* (2011.01)
*B01J 35/06* (2006.01)
*B01J 23/42* (2006.01)
*B01J 23/44* (2006.01)
*B01J 23/825* (2006.01)
*B01J 23/89* (2006.01)
*B01J 37/00* (2006.01)
*B01J 37/04* (2006.01)
*H01M 8/10* (2006.01)

(52) U.S. Cl.
CPC ........ *H01M2008/1095* (2013.01); *Y02E 60/50* (2013.01); *Y10S 977/775* (2013.01)

(56) References Cited

U.S. PATENT DOCUMENTS

2008/0003481 A1* 1/2008 Ecer ................................ 429/33
2008/0063915 A1* 3/2008 Yamamoto ....................... 429/30
2008/0260937 A1* 10/2008 Tang ................................. 427/64
2010/0202958 A1* 8/2010 Yoon et al. .................. 423/447.2

FOREIGN PATENT DOCUMENTS

| | | |
|---|---|---|
| JP | 2003-200052 A | 7/2003 |
| JP | 2005-310714 | 11/2005 |
| JP | 2006-139947 | 6/2006 |
| JP | 2006-253030 | 9/2006 |
| JP | 2007-220414 | 8/2007 |
| JP | 2008-077974 | 4/2008 |
| JP | 2009-117248 | 5/2009 |
| WO | WO2006/071066 * | 7/2006 |

OTHER PUBLICATIONS

Effect of Heat Treatment on Reinforcing Properties of Carbon Black Industrial and Engineering Chemistry vol. 47, No. 6, pp. 1286-1290, 1955.*

* cited by examiner (a)

(b)

(a)         (b)         (c)

CATALYST FOR FUEL CELL AND METHOD FOR PREPARING THE SAME

CROSS-REFERENCE TO RELATED APPLICATION

This application claims under 35 U.S.C. §119(a) the benefit of Korean Patent Application No. 10-2010-0073821 filed Jul. 30, 2010, the entire contents of which are incorporated herein by reference.

BACKGROUND (a) Technical Field

The present disclosure generally relates to a catalyst for a fuel cell and a method for preparing the same. More particularly, it relates to a method for preparing a catalyst used for an electrode of a fuel cell by using different types of crystalline carbon materials, and a catalyst for a fuel cell prepared by the method.

(b) Background Art

In general, a fuel cell is a device that converts chemical energy of a fuel, such as hydrogen, into electrical energy. As the theoretical efficiency of fuel cells approaches 100% and generally reaches a high level of 80 to 50%, extensive research has been aimed at more efficiently using fuel cells and renewable energy in the form of hydrogen, particularly as resources become more scarce.

The operation of fuel cells is based on an electrochemical reaction which involves the migration of electrons, and it is important to induce a reaction that can reduce overvoltage such that the polarization at an equilibrium potential is minimized at the same rate of the electrochemical reaction.

For this purpose, the dispersion of catalyst particles should be improved and the catalyst particles should also be provided in a form capable of participating in the reaction.

In general, during operation of the fuel cell, the operating potential is in a range of 1.0 to 0.4 V. In the case of carbon, the thermodynamic standard oxidation potential in gasification is 0.207 $V_{RHE}$, and thus the natural oxidation will occur a potential higher than 0.207 $V_{RHE}$.

As such, it has been found that the operating voltage conditions of a fuel cell generates a high oxidation overvoltage with respect to carbon to create a negative atmosphere. Moreover, during start and stop of the fuel cell, outside air is fed into an oxidation electrode (i.e., a fuel electrode) and is mixed with hydrogen as a fuel, and thus a high potential of 1.2 $V_{RHE}$ or higher is generated in the carbon based on its boundary [Electrochem Solid-State Lett. 9 (2006) A183, J. Power Sources 158 (2006) 1306]. Such conditions accelerate the corrosion rate of carbon, and thus the durability of the fuel cell is reduced.

It has, thus, been found that delay of the electrochemical reaction is one important way to potentially improve the durability of a fuel cell.

One proposed method for improving the rate of the electrochemical reaction, which occurs at the catalyst particles of the fuel cell, is by improving the surface reaction rate of the catalyst particles. As such, extensive research has been aimed at developing a platinum alloy catalyst and core/shell type catalyst particles and, at the same time, optimizing the shape of an electrode by controlling the porosity of the electrode, micronizing the catalyst particles, and controlling the effective reaction area (J. Power Sources, 139, 73).

Moreover, in order to improve the durability of the catalyst and the electrode of the fuel cell by delaying the corrosion rate of carbon, extensive research has been aimed at developing a crystalline carbon support with excellent corrosion resistance.

It is reported that typical crystalline carbon nanotubes or nanofibers have a higher oxidation resistance than active carbons such as Ketjen Black and Vulcan because they are difficult to react with external $H_2O$ [ECS Trans. 16 (2008) 2101].

However, these high crystalline carbon materials have not been successfully used as a carbon support to fuel cells. It has been found that, micronization of catalyst particles on the surface of a high crystalline carbon support is very difficult, and it is impossible to optimize the electrode structures (e.g. the shape of pores) during electrode formation. For example, in the case where the carbon nanofibers have a small fiber diameter, the straightness of the carbon nanofibers is reduced, and they become entangled with each other. this makes it very difficult to form mesopores in the nanofibers. Moreover, in spite of the high surface area, it is difficult to finely and uniformly disperse catalyst particles, and thus it is difficult to increase the effective active area of the particles. Furthermore, in the case of carbon nanofibers having a large fiber diameter, a high support ratio is not achieved, or the carbon nanofibers must be ground into small particles, which reduces the porosity, thereby reducing the effective specific reaction area.

Linear crystalline carbon materials can be classified into tubular, platelet, and herringbone carbon materials.

Of the three, the tubular carbon materials have the highest oxidation resistance because the base plane is exposed on the surface. However, the tubular carbon material has no space in which the catalyst particles, such as platinum, can be preferably located. As such, it is difficult to achieve a fine and uniform distribution of catalyst particles, and Ostwald ripening occurs due to the surface migration of catalyst particles (Carbon Today, 90, 277).

In the case of the platelet and herringbone carbon materials, the edge of the base plane is exposed on the surface, thereby providing a space in which the carbon particles can be stably supported. However, the oxidation resistance is reduced as a result of exposure of the edge of the base plane on the surface. As such, the materials exhibit an oxidation resistance which is not more advantageous than that of active carbon materials according to circumferences.

Thus, it is necessary to provide a material having the support performance such as that exhibited by platelet or herringbone carbon particles and, at the same time, having the oxidation resistance such as that exhibited by tubular carbon nanofibers.

Further, in order to improve the performance of a fuel cell catalyst, it is necessary to provide an electrode structure in which the triple point of the support for carrying the catalyst and electrons, the ionomer for transporting protons, and the catalyst particles as a reaction site in a three-dimensional shape is properly developed in an area where the material reaction occurs smoothly, i.e., an electrode structure that optimizes such an effective reaction point. Moreover, the development of a material that can ensure the oxidation resistance for ensuring long-term stability is urgently required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a high performance, high durability fuel cell catalyst and a method for preparing the same. In particular, the present invention provides a crystalline carbon support that can be effectively used as a support of a fuel cell catalyst. In accordance with the present invention, a crystalline carbon support is provided that is capable of creating an optimal electrode structure and that improves the support and dispersion of catalyst particles. More particularly, according to the present invention, by crystallization of the carbon support and expansion of surface area a carbon support is provided having improved properties.

According to one embodiment of the present invention, an electrode is prepared using a fuel cell catalyst containing two different types of conductive carbon materials, preferably wherein a porous structure is provided by the use of such materials.

According to an exemplary embodiment, the first type of conductive carbon material is a platelet or herringbone linear crystalline carbon nanofiber material, and the second type of conductive carbon material is acetylene black. Preferably, the platelet or herringbone linear crystalline carbon nanofiber has a peak diameter of about 30 to 150 nm, and the acetylene black has a primary particle size of 20 to 80 nm. The materials are preferably heat-treated to improve the surface area and long-term stability.

In one embodiment of the present invention, the first and second carbon materials are mixed in a suitable ratio (e.g. about 20 to 80%) to synthesize a platinum-supported catalyst using any suitable process, such as, for example a modified polyol process disclosed in Korean Patent Application No. 10-2009-0056959, and shown in FIG. 5A herein. The resulting synthesized catalyst can be applied to a fuel cell electrode.

For example, in one embodiment, the supported catalyst is prepared by a polyol process, in which NaOH is used to regulate pH to 0.06 M, which includes mixing supports, pretreating a CFN precursor, adding a platinum precursor, and heating and refluxing the mixture to reduce the platinum precursor.

The present invention is characterized in that different types (e.g. linear and spherical) of crystalline carbon materials are used instead of a conventional material for electrode formation, and the crystalline carbon materials are pretreated to improve the crystallinity and increase the surface area, thereby improving the long-term stability and support performance and, at the same time, optimizing the electrode structure.

In one embodiment, the present invention provides a method for preparing a catalyst for a fuel cell electrode, the method including: heat-treating linear crystalline carbon nanofibers at a suitable temperature (e.g. about 2,000 to 2,800° C.) in an inert gas atmosphere to thereby improve oxidation resistance due to an improvement in crystallinity; heat-treating spherical crystalline carbon particles at a suitable temperature (e.g. about 1,000 to 1,500° C.) to thereby increase the surface area; individually dispersing the different types of carbon materials in an alcohol, such as ethylene glycol, respectively; mixing the different types of carbon supports in a predetermined mixing ratio to form a slurry; and preparing a platinum-supported catalyst or a platinum alloy-supported catalyst by adding NaOH, a platinum precursor or a platinum alloy precursor, and the different types of carbon materials to a solvent for catalyst synthesis, and refluxing the mixture at a suitable temperature (e.g. about 140 to 180° C.) to reduce the alloy precursor or the platinum alloy precursor.

In a preferred embodiment, the linear crystalline carbon nanofibers may be a herringbone carbon support, or a platelet carbon support.

In another preferred embodiment, the spherical crystalline carbon particles may be acetylene black.

In still another preferred embodiment, the platinum alloy precursor may be selected from the group consisting of a platinum-nickel precursor, a platinum-cobalt precursor, and a platinum-palladium precursor.

In yet another preferred embodiment, the catalyst support may be selected from the group consisting of a platinum-supported catalyst, a platinum alloy-supported catalyst in the form of a solid solution, and a platinum allow-supported catalyst in the form of a core-shell.

In still yet another preferred embodiment, the linear crystalline carbon nanofibers and the spherical crystalline carbon particles may be mixed in a ratio ranging from 20:80 wt % to 80:20 wt %.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
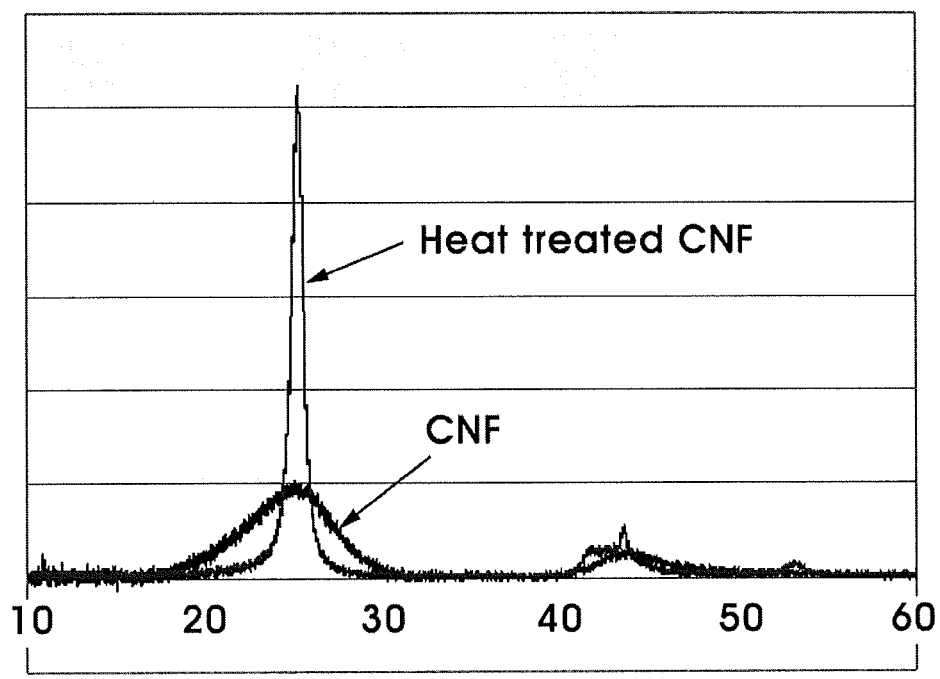
FIG. 1 is a graph showing the results of X-ray diffraction (XRD) analysis of linear crystalline carbon nanofibers (CNFs) before and after heat treatment at high temperature, in which a change in crystallinity is shown.

Reference numerals set forth in the Drawings includes reference to the following elements as further discussed below:

100: acetylene black
200: linear carbon nanofibers
300: supported catalyst It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method for preparing a catalyst support for a fuel cell. In particular, according to a preferred embodiment, the method comprises performing a pretreatment process for ensuring long-term stability and support performance, preparing a metal-supported catalyst by mixing different types of carbon materials in a predetermined ratio, and preparing an MEA electrode using the metal-supported catalyst.

A variety of different types of electrically-conductive materials can suitably be used in accordance with the present invention. Preferably, as a first electrically-conductive carbon support, linear crystalline carbon nanofibers are used, and in an exemplary embodiment, linear crystalline carbon nanofibers having a peak diameter of 30 to 200 nm are used. According to a preferred embodiment, the linear crystalline carbon nanofibers form the frame of an electrode, while different types of carbon materials are present in the frame, thereby creating a three-dimensional material transfer space.

In accordance with on embodiment, carbon nanofibers (CNFs) are synthesized by any suitable process such as by chemical vapor deposition (CVD), in which the shape or fiber diameter of linear carbon nanofibers is controlled. In preferred embodiments, the shape or fiber diameter is controlled according to the type or shape of transition metal catalysts (such as Ni, Fe, Mn, Al, etc.) in the reactor, which can be any suitable reactor such as a vertical furnace. In a preferred embodiment, the internal temperature of the reactor is in a suitable range such as 600 to 1,000° C., and a C source such as an alkane (methane, ethane, etc.) or CO gas is supplied to the reactor to synthesize the carbon nanofibers [Applied Catalysis A, 338 (2008) p 147].

In accordance with a preferred embodiment of the present invention, as mentioned above, platelet or herringbone carbon nanofibers having a high catalyst particle support performance are used.

The crystallinity of support particles according to the synthesis of these carbon materials (i.e. platelet and herringbone carbon nanofibers) is higher than other active carbons such as Vulcan XC-72, Ketjen Black EC-300, etc., which are widely used as supports for conventional fuel cells. Thus, the carbon support of the present invention is provided with relatively high long-term stability. In addition, since the carbon support should have increased resistance to corrosion due to oxidation during operation under severe conditions of the fuel cell, the carbon support of the present invention is preferably further heat-treated at suitable temperatures (e.g. 2,200 to 2,800° C.). The improvement of crystallinity in the present materials is shown in the XRD pattern of FIG. 1.

Thus, in accordance with the present invention, it is preferred that linear crystalline carbon nanofibers are used, and heat treatment is performed to further improve the long-term stability thereof. It is further preferred that the support performance of catalyst particles is improved using platelet or herringbone carbon materials.

According to an embodiment of the present invention, among the different types of electrically-conductive materials, a commercially available acetylene black is preferably used as a second electrically-conductive carbon support material. It is preferred that heat treatment is performed to increase the surface area and improve the long-term stability of the material.

In general, commercially available acetylene black has a primary particle size of 20 to 80 nm, and the base plane is exposed on its surface. Because the specific surface area of commercially available acetylene black is small, its capacity to support catalyst particles (e.g. when used as a fuel cell catalyst support) is not particularly good. Therefore, it is known that there are disadvantages to using acetylene black for the formation of three-dimensional pores for effective material transport.

Figure 2:
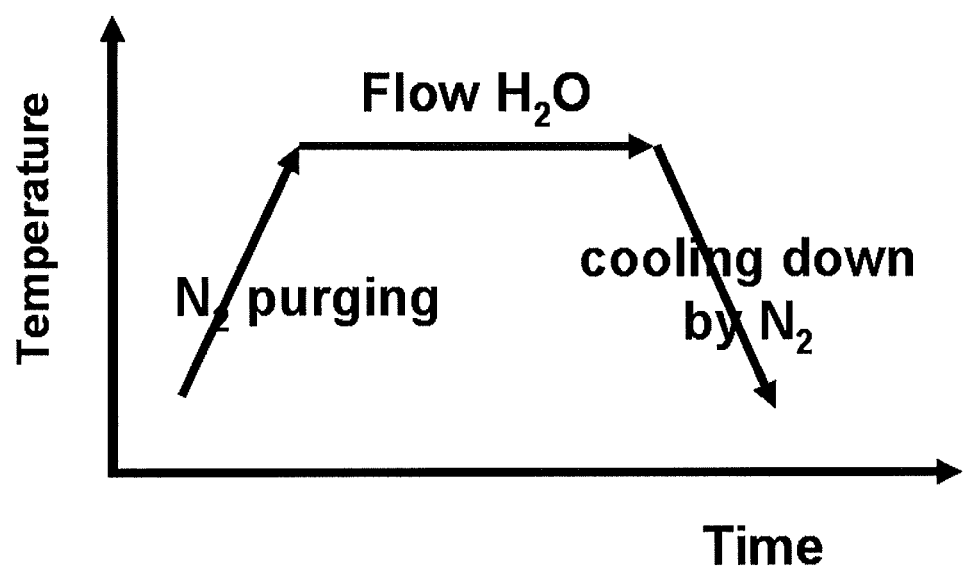
FIG. 2 is a schematic diagram showing heat treatment of acetylene black in a high temperature steam atmosphere to provide a high specific surface area.
Figure 3:
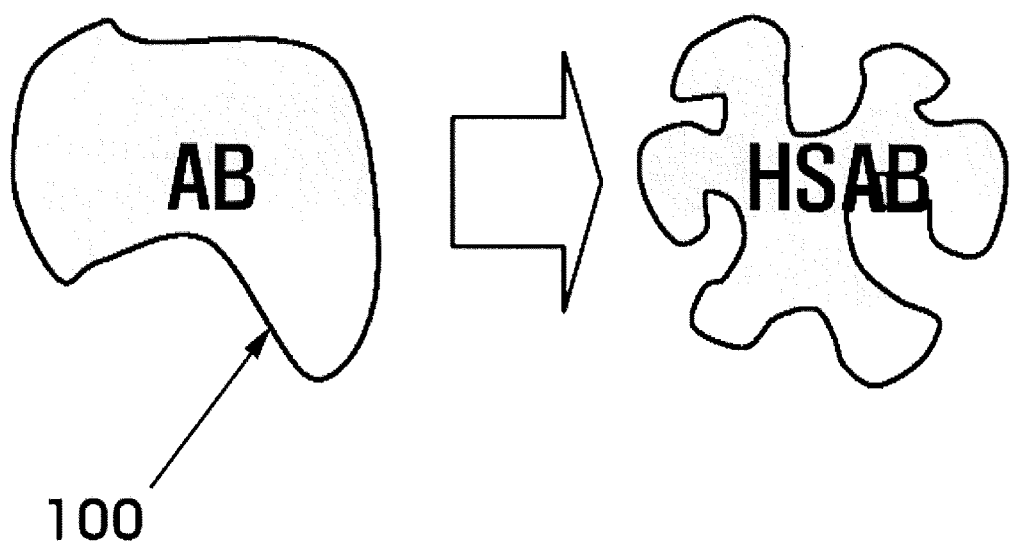
FIG. 3 is schematic diagram showing an increase in specific surface area of acetylene black in a high temperature steam atmosphere.

However, since the base plane of acetylene black is exposed on the surface, it is one type of carbon material with excellent hydrophobicity, and it has excellent oxidation resistance compared to active carbons. In order to maintain the advantages of acetylene black while overcoming its drawbacks, according to the present invention the acetylene black was heat-treated at 1,000 to 1,500° C. in a steam atmosphere for 1 to 3 hours, as shown in FIG. 2. As a result, the acetylene black is partially oxidized and has a high specific area, which is very important in the present invention. FIG. 3 is schematic diagram showing this phenomenon. In particular, as demonstrated, the support performance of catalyst particles and the long-term stability under deterioration conditions are maximized in accordance with the present invention by increasing the specific surface area and improving the crystallinity by the heat treatment in a steam atmosphere. The thus treated the acetylene black is provided with excellent properties as a uniform and dense catalyst carrier, which is a beneficial characteristic provided by the present invention.

Further, in accordance with the present invention, in order to overcome the drawbacks of each of the different types of carbon materials, the different types of carbon materials are mixed in a suitable predetermined ratio. For example, in accordance with one embodiment, the linear crystalline carbon nanofibers and the spherical crystalline carbon particles are mixed in a ratio ranging from 20:80 wt % to 80:20 wt % to form a mixed carbon support.

Figure 4:
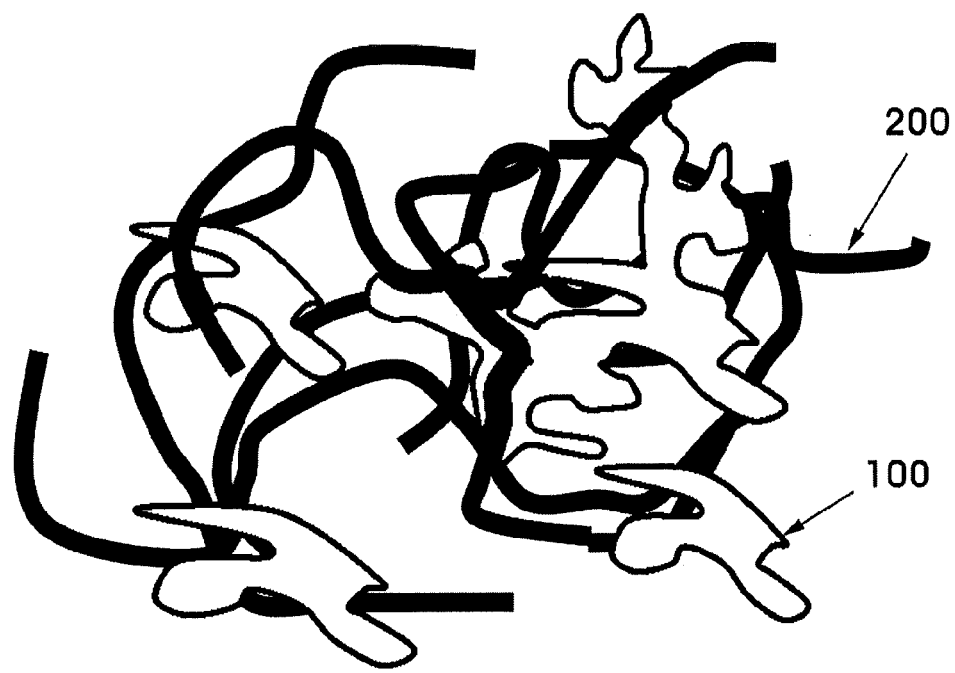
FIG. 4 is a schematic diagram showing a structure in which linear crystalline carbon nanofibers and spherical crystalline carbon particles as fuel cell supports are mixed together in accordance with an embodiment of the present invention.

In this case, the mixed carbon support has a three-dimensional shape as shown in FIG. 4, in which the linear carbon nanofibers 200 form the frame of the electrode and increase the continuity in the electrode direction, thereby preventing the occurrence of cracks in the electrode. As further shown, the surface-treated acetylene black 100 serves as a filler between the linear carbon nanofibers 200 to act as a dense carrier of metal catalyst and optimize the material path.

Moreover, in accordance with the present invention, the improved crystallinity allows the present material to have excellent hydrophobicity on its surface, and thereby the concentration polarization, which is an important factor that affects the performance of the fuel cell, is reduced.

In particular, in the case of the mixed support for the fuel cell provided in accordance with the present invention, the performance improvement effect due to the optimized pore structure and the surface hydrophobicity and the performance improvement effect due to the improvement of the support performance interact with each other.

Figure 5:
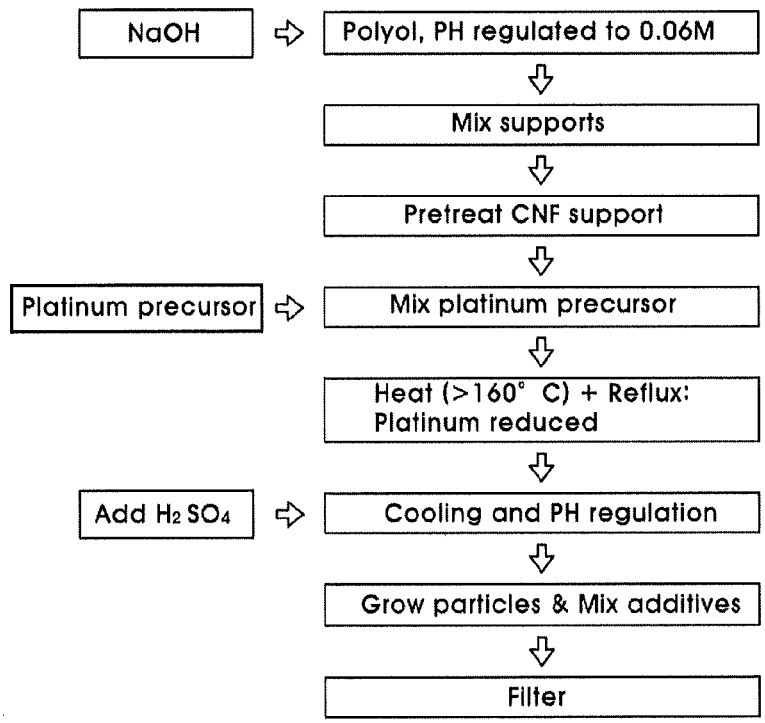
FIG. 5A is a diagram showing a process of preparing a platinum-supported catalyst or a platinum alloy-supported catalyst using different types of carbon materials in accordance with an embodiment of the present invention.
FIG. 5B is a schematic diagram showing a platinum-supported catalyst or a platinum alloy-supported catalyst by synthesis in accordance with an embodiment of the present invention.
Figure 5:
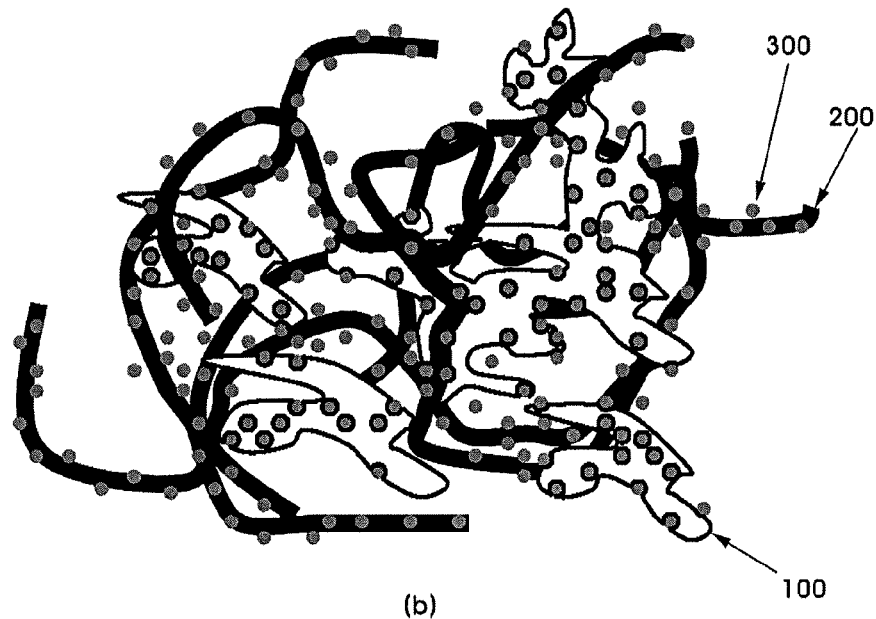

In accordance with an embodiment of the present invention, a platinum-supported catalyst or a platinum alloy-supported catalyst is synthesized in a manner shown in FIG. 5A (which is described in Korean Patent Application No. 10-2009-0056959). The thus synthesized supported catalyst 300 is shown in FIG. 5B.

The types of catalysts suitable for use in the present invention include known catalysts, such as an alloy catalyst in the form of a solid solution and an allow catalyst in the form of a core-shell as well as the platinum catalyst.

Figure 6:
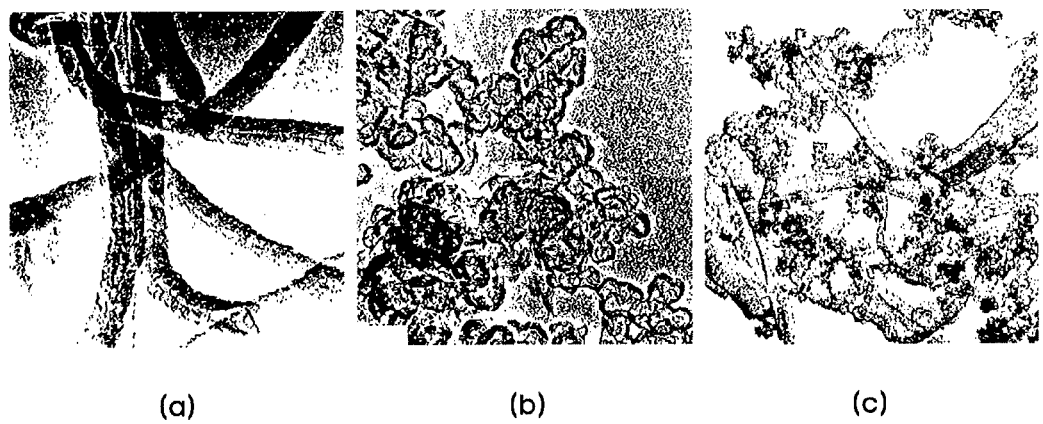
FIG. 6 shows electron microscope images of linear crystalline carbon nanofibers, spherical crystalline carbon particles, and a catalyst particle-supported catalyst thereof in accordance with an embodiment of the present invention.

Electron microscope images of the catalysts synthesized in the above manner are shown in FIG. 6. In particular, FIGS. 6A and 6B show the images of the different types of carbon materials after the above-described heat treatment, and FIG. 6C shows an image of the catalyst particle-supported catalyst.

Figure 7:
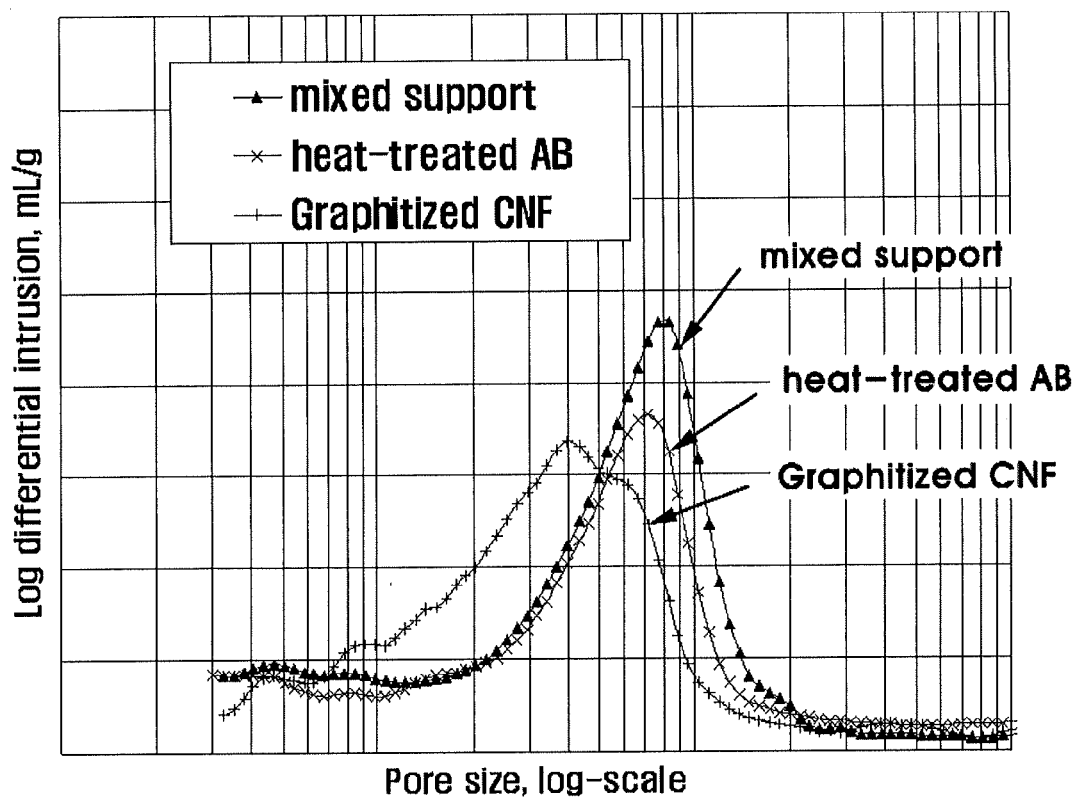
FIG. 7 is a graph showing the results of pore distributions in electrodes, analyzed using a porosimeter, prepared using linear crystalline carbon nanofibers and spherical crystalline carbon particles as catalyst supports, and a mixed support, respectively, in accordance with an embodiment of the present invention.

FIG. 7 shows the pore distributions in the electrodes prepared using the linear crystalline carbon nanofibers, the spherical crystalline carbon particles, and the mixed support thereof in accordance with the present invention. As demonstrated, the electrode prepared using the mixed support has a porosity greater than that of the electrode prepared using each catalyst support individually.

Figure 8:
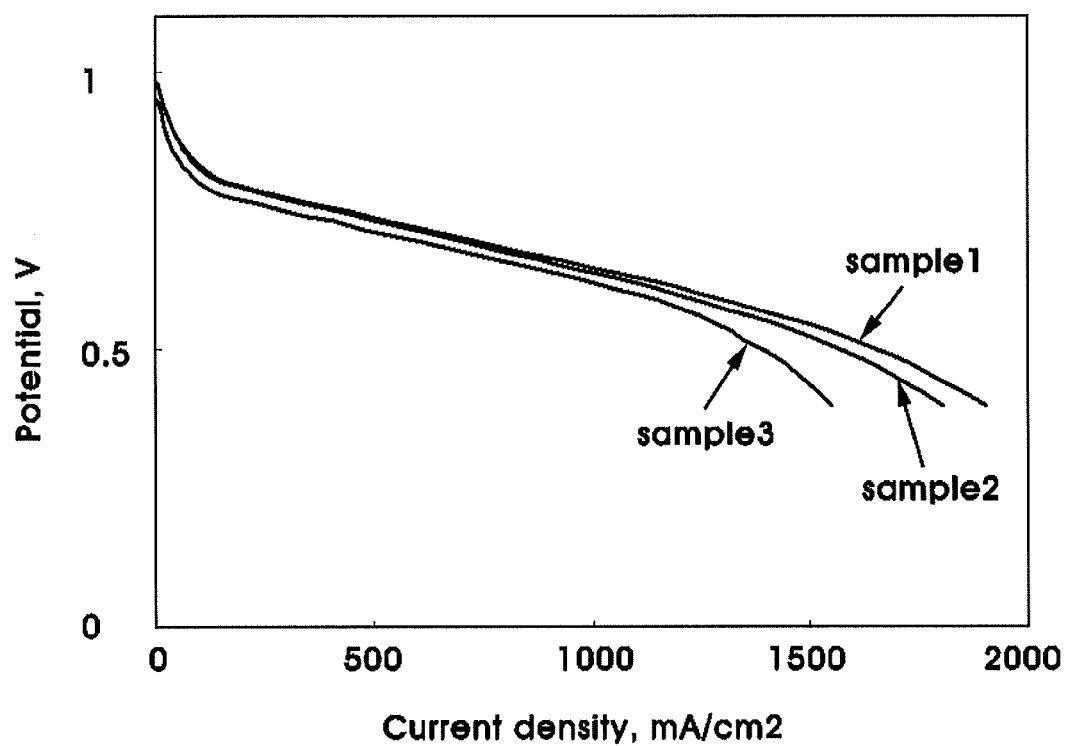
FIG. 8 is a graph showing the results of cell performance in electrodes prepared using linear crystalline carbon nanofibers and spherical crystalline carbon particles as catalyst supports, and a mixed support thereof, respectively, in accordance with an embodiment of the present invention.

FIG. 8 shows the cell performance in the electrodes prepared using the linear crystalline carbon nanofibers, the spherical crystalline carbon particles, and the mixed support thereof in accordance with the present invention. As demonstrated, the performance of the electrode prepared using the mixed support has improved performance, particularly due to the activation of high potential and the improvement of material transfer at low potential region. In particular, the spherical acetylene black is disposed between the linear carbon nanofibers to form an effective material transfer path and, at the same time, the triple point of the catalyst particles, an electrode binder, and the support is effectively developed. In FIG. 8, sample-1 shows the performance of the electrode prepared using the mixed support of different types of carbon materials, sample-2 shows that of the electrode prepared using the linear crystalline carbon nanofibers, and sample-3 shows that of the electrode prepared using the spherical crystalline carbon particles.

Figure 9:
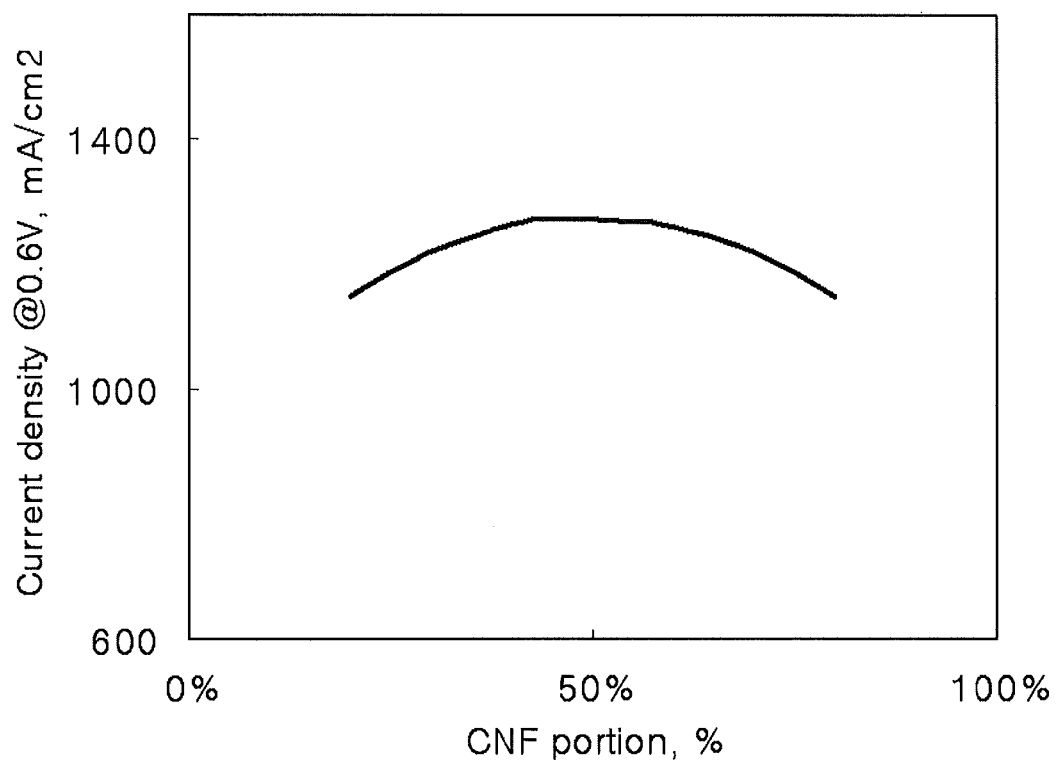
FIG. 9 is a graph showing a change in cell performance at 0.6 V of electrodes prepared by varying the mixing ratio of different types of carbon materials, in accordance with an embodiment of the present invention.

FIG. 9 shows the change in cell performance at 0.6 V of the electrodes prepared by varying the mixing ratio of different types of carbon materials. As demonstrated, the cell performance was excellent overall, and particularly at a mixed ratio of about 0.5.

Figure 10:
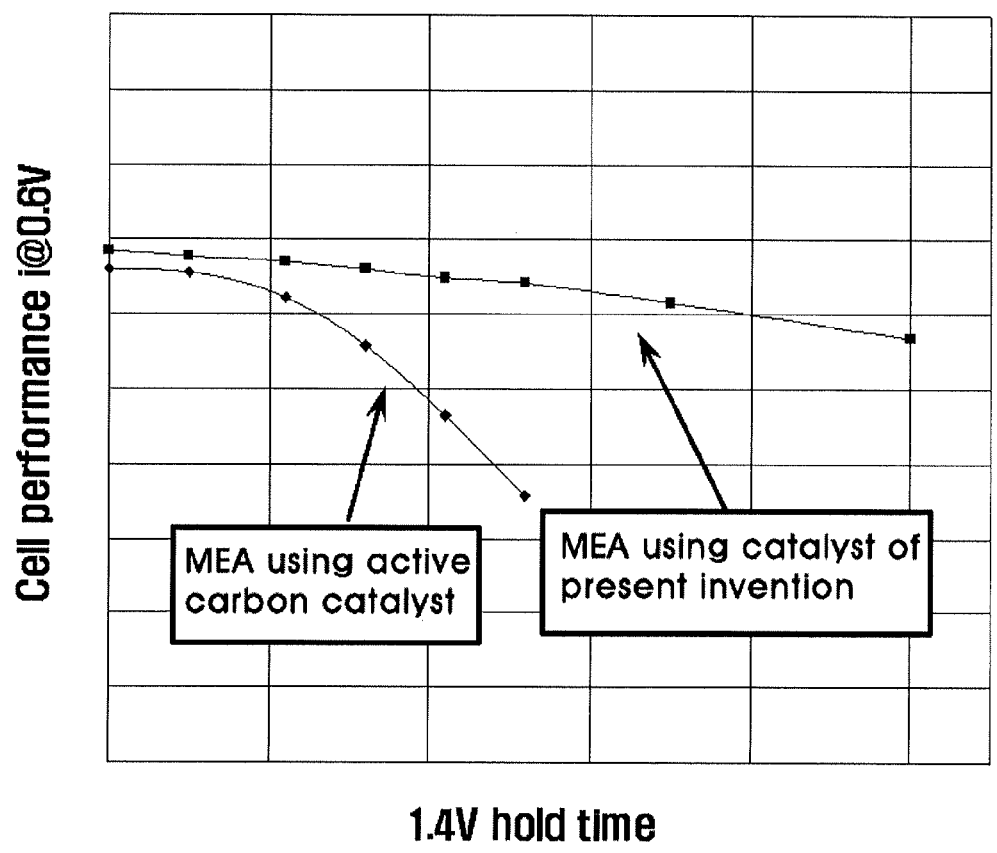
FIG. 10 is a graph showing a reduction in performance of membrane electrode assemblies prepared using a typical active carbon catalyst and a mixed catalyst of the present invention and maintained at a voltage of 1.4 V where the carbon support is rapidly oxidized with respect to retention times.

FIG. 10 shows the reduction in performance of membrane electrode assemblies (MEAs) prepared using a typical active carbon catalyst as compared to the mixed support of the present invention. In the case where the MEA is maintained at a voltage of 1.4 V at which the carbon support is rapidly oxidized, the performance of the MEA is decreases as time goes on. On the other hand, as demonstrated, the carbon support of the present invention has excellent oxidation resistance over time. It is thus demonstrated that the crystalline carbon exhibits excellent performance even at high voltage due to high oxidation resistance.

EXAMPLES

Based on the method for preparing the fuel cell catalyst and electrode, the linear crystalline carbon nanofibers and the spherical crystalline carbon particles were mixed in a ratio of 20:80 wt % to 80:20 wt %, for example, in a ratio of 1:1.

Moreover, a supported catalyst was prepared using 50 wt % of crystalline carbon support and 50 wt % of catalyst metal support.

The supported catalyst contained both a platinum catalyst and a platinum alloy catalyst containing a transition metal.

The preparation of the supported catalyst will be described in detail below.

As the first carbon support, platelet or herringbone linear crystalline carbon nanofibers having a fiber diameter of 30 to 200 nm were used.

The linear crystalline carbon nanofibers were heat-treated at 2,200 to 2,800° C. in an argon atmosphere, and the heat-treated linear crystalline carbon nanofibers were ground and dispersed in ethylene glycol.

The linear crystalline carbon nanofibers were ground using a rotary grinder and an ultrasonicator and stirred using a magnetic stir bar.

As the second carbon support, commercially available acetylene black was partially oxidized at 1,000 to 1,500° C. in a steam atmosphere for 1.5 hours, cooled under nitrogen, ground and dispersed in the same manner as the first carbon support.

Subsequently, the thus prepared support solutions were mixed in a predetermined mixing ratio and further stirred for 1 hour.

After the total amount of ethylene glycol reached 150 ml, the platinum-supported catalyst was prepared by a modified polyol process described by the present inventor in Korean Patent Application No. 10-2009-0056959, and the platinum alloy-supported catalyst was prepared by a method disclosed in Korean Patent Application No. 10-2009-0114623.

FIG. 6 shows the shapes of the first and second carbon supports and the catalyst particle-supported catalyst, and FIG. 7 demonstrates that the pore structure of the MEA prepared using the supported catalyst according to the present invention was improved compared to that of each support individually.

Moreover, the improvement in cell performance of the electrode prepared using the supported catalyst according to the present invention is shown in FIGS. 8 to 10.

As described above, the catalyst prepared using different types of crystalline carbon materials according to the present invention has a uniform dispersion of platinum or platinum alloy catalyst particles and excellent long-term stability, particularly due to high oxidation resistance.

Moreover, the catalyst according to the present invention has an optimized electrode structure in which linear crystalline carbon nanofibers and spherical crystalline carbon particles are mixed together, thereby improving the performance of the fuel cell.

The catalyst according to the present invention can be effectively used to improve the initial performance and durability of the fuel cell.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for preparing a catalyst for a fuel cell electrode, the method comprising:
    heat-treating a linear crystalline carbon nanofibers of catalyst support at a temperature of 2,000 to 2,800° C. in an inert gas atmosphere to improve oxidation resistance due to an improvement in crystallinity of the carbon nanofibers;
    heat-treating a spherical crystalline acetylene black of catalyst support at a temperature of 1,000 to 1,500° C. in a high temperature steam atmosphere to increase the surface area of the acetylene black;
    dispersing the linear crystalline carbon nanofibers of catalyst support and the spherical crystalline acetylene black of catalyst support;
    mixing the linear crystalline carbon nanofibers of catalyst support and the spherical crystalline acetylene black of catalyst support in a predetermined mixing ratio to form a slurry; and
    preparing a platinum-supported catalyst or a platinum alloy-supported catalyst by adding NaOH, a platinum precursor or a platinum alloy precursor, and the mixture of the linear crystalline carbon nanofibers of catalyst support and the spherical crystalline acetylene black of catalyst support to a solvent for catalyst synthesis, and refluxing at a temperature of 140 to 180° C. to reduce the platinum precursor or the platinum alloy precursor,
    wherein the linear crystalline carbon nanofibers of catalyst support has a peak diameter of about 30 to 200 nm.

2. The method of claim 1, wherein the linear crystalline carbon nanofibers of catalyst support is a herringbone carbon support, or a platelet carbon support.

3. The method of claim 1, wherein the platinum alloy precursor is selected from the group consisting of a platinum-nickel precursor, a platinum-cobalt precursor, and a platinum-palladium precursor.

4. The method of claim 1, wherein the catalyst is selected from the group consisting of a platinum-supported catalyst, a platinum alloy-supported catalyst in the form of a solid solution, and a platinum alloy-supported catalyst in the form of a core-shell.

5. The method of claim 1, wherein the linear crystalline carbon nanofibers of catalyst support and the spherical crystalline acetylene black of catalyst support are mixed in a ratio of from 20:80 wt % to 80:20 wt %.

6. A catalyst for a fuel cell electrode prepared by the method of claim 1.

7. A catalyst for a fuel cell comprising:
    two types of crystalline carbon supports, the first type comprising a linear crystalline carbon nanofibers of catalyst support that have been heat-treated to improve crystallinity, the second type comprising a spherical crystalline acetylene black of catalyst support that have been heat-treated in a high temperature steam atmosphere at a temperature of 1,000 to 1,500° C. to increase their surface area,
    wherein the ratio of the linear crystalline carbon nanofibers of catalyst support to the spherical crystalline acetylene black of catalyst support ranges from 20:80 wt % to 80:20 wt %,
    wherein the linear crystalline carbon nanofibers of catalyst support has a peak diameter of about 30 to 200 nm.

8. The catalyst of claim 7, wherein the catalyst is a platinum-supported catalyst or a platinum alloy-supported catalyst.

* * * * *